UNITED STATES PATENT OFFICE.

ARTHUR ASHWORTH AND JOSHUA BÜRGER, OF MANCHESTER, ENGLAND.

BROWN DYE.

SPECIFICATION forming part of Letters Patent No. 548,416, dated October 22, 1895.

Application filed June 9, 1894. Serial No. 541,096. (Specimens.) Patented in England June 13, 1893, No. 11,556.

*To all whom it may concern:*

Be it known that we, ARTHUR ASHWORTH and JOSHUA BÜRGER, of Manchester, in the county of Lancaster, England, have invented a new and useful Method for the Production of New Coloring-Matters Suitable for Dyeing and Printing, (for which we have received British Patent No. 11,556, dated June 13, 1893,) of which the following is a specification.

In our application for Letters Patent, Serial No. 519,268, dated August 2, 1894, we have described a product obtained by the action of bisulfites on alpha-nitrosobetanaphthol. This product has the remarkable property that it combines in a solution of alkali carbonates with diazo compounds, forming new and valuable coloring-matters, dyeing wool either with or without mordants. Of these new products the combinations of the diazotized naphthyl-amines with the above-mentioned compound of nitrosobetanaphthol are distinguished by their great beauty and fastness.

To prepare these azo dye-stuffs we proceed, for instance, in the following manner: 14.4 parts, by weight, of alpha-naphthylamine or 14.4 parts, by weight, of beta-naphthylamine are diazotized in the usual way and combined with about twenty-eight parts, by weight, of a solution of our combination product between alpha-nitrosobetanaphthol and sodium bisul-fite in sodium carbonate, and which has to be kept alkaline with carbonate of soda during the whole of the reaction. The mixture is left standing for some time, and then the new colors are salted out, filtered, pressed, and dried. They form reddish-brown to brown powders. They are easily soluble in water, and dye and print on chrome mordants reddish-brown to brown shades. They are soluble in alcohol with yellowish-brown color. They are soluble in carbonate of soda and caustic soda with yellowish-brown color. In concentrated sulfuric acid the beta-naphthyl-amine compound dissolves with a reddish-purple color, which changes on dilution into a light-brown color, finally separating a brown precipitate, while the alpha-naphthylamine compound dissolves in concentrated sulfuric acid with a bluish-green color, which on dilution forms a reddish-brown precipitate.

What we claim as new is—

1. The method of producing new coloring matters by combining diazo compounds with the condensation product of alphanitrosobeta-naphthol and sodium-bisulfite, substantially in the manner as above described.

2. The new dye consisting of a brownish powder easily soluble in water soluble in caustic soda, carbonate of soda and in alcohol with yellowish brown color, dyeing on unmordanted wool from an acid bath brown shades, dyeing on fibers mordanted with chrome and printing with chrome mordants brown shades and having the properties substantially as described.

ARTHUR ASHWORTH.
JOSHUA BÜRGER.

Witnesses:
ARTHUR C. HALL,
JOHN W. THOMAS.